United States Patent
Brown et al.

(10) Patent No.: US 12,457,478 B2
(45) Date of Patent: Oct. 28, 2025

(54) TAG BASED TRACKING WITH FARADAY CAGE HOPPER

(71) Applicant: Phil My Bin, LLC, Northfield, MN (US)

(72) Inventors: Burdette Brown, Northfield, MN (US); Keri Lynn Rateliff, Lakeville, MN (US)

(73) Assignee: Phil My Bin, LLC, Northfield, MN (US)

( * ) Notice: Subject to any disclaimer, the term of this patent is extended or adjusted under 35 U.S.C. 154(b) by 1078 days.

(21) Appl. No.: 17/446,595

(22) Filed: Aug. 31, 2021

(65) Prior Publication Data

US 2023/0064946 A1 Mar. 2, 2023

(51) Int. Cl.
*H04W 4/35* (2018.01)
*G06Q 10/087* (2023.01)
*H05K 9/00* (2006.01)

(52) U.S. Cl.
CPC ............ *H04W 4/35* (2018.02); *G06Q 10/087* (2013.01); *H05K 9/002* (2013.01); *H05K 9/0045* (2013.01); *H05K 9/006* (2013.01)

(58) Field of Classification Search
CPC ............... G07F 17/0092; G06Q 10/08; G06Q 10/06315; G06Q 10/087; H01Q 17/007; H05K 9/0045; H05K 9/002; H05K 9/006; G16H 40/20; G16H 40/63; H04W 4/35
USPC .......... 700/242, 216; 340/10.1; 705/28, 7.25
See application file for complete search history.

(56) References Cited

U.S. PATENT DOCUMENTS

| | | | | |
|---|---|---|---|---|
| 6,847,861 B2* | 1/2005 | Lunak | ................. | G06Q 10/087 700/242 |
| 8,384,545 B2* | 2/2013 | Hussain | ............... | G06Q 10/087 340/568.1 |
| 8,571,701 B2* | 10/2013 | Lunak | ................. | G06Q 10/087 700/216 |
| 9,959,520 B2* | 5/2018 | Endries | ................ | G06Q 10/087 |
| 10,204,315 B2* | 2/2019 | White | ................. | G06K 7/0008 |
| 10,489,742 B2* | 11/2019 | Cheruku | ................ | G07G 3/003 |
| 11,989,686 B2* | 5/2024 | Mitchell | ............ | G06K 17/0029 |
| 2007/0001809 A1* | 1/2007 | Kodukula | ............... | G07F 9/026 340/572.7 |
| 2008/0319580 A1* | 12/2008 | Vahlberg | .............. | G06Q 10/087 700/242 |
| 2009/0230020 A1* | 9/2009 | Clayman | .......... | G06K 19/07327 206/719 |
| 2010/0030667 A1* | 2/2010 | Chudy | ................... | G06Q 10/08 705/28 |
| 2010/0066497 A1* | 3/2010 | Lim | ....................... | G06Q 10/08 340/10.1 |
| 2015/0127362 A1* | 5/2015 | DeBusk | ............. | G07F 17/0092 705/2 |

(Continued)

FOREIGN PATENT DOCUMENTS

CN 110910572 A * 3/2020
EP 3722989 A1 * 10/2020 ............. A47F 3/005

*Primary Examiner* — Thomas Randazzo
(74) *Attorney, Agent, or Firm* — Schwegman Lundberg & Woessner, P.A.

(57) ABSTRACT

A system includes a hopper that is a faraday cage configured to receive multiple bins capable of holding one or more parts, each bin having a wirelessly readable identifier tag with a unique digital ID. An antenna is positioned within the hopper to receive wireless signals representative of the unique digital ID of each bin placed within the hopper.

20 Claims, 7 Drawing Sheets

(56) References Cited

U.S. PATENT DOCUMENTS

| | | | |
|---|---|---|---|
| 2015/0379449 A1* | 12/2015 | Gopinath | G06Q 10/087 |
| | | | 705/7.25 |
| 2016/0285171 A1* | 9/2016 | Moylan | B32B 7/025 |
| 2017/0196128 A1* | 7/2017 | Elizondo, II | A61B 50/18 |
| 2019/0057566 A1* | 2/2019 | Mlynarczyk | G06K 19/07798 |
| 2020/0074257 A1* | 3/2020 | Leitermann | H04W 4/35 |

* cited by examiner

TAG BASED TRACKING WITH FARADAY CAGE HOPPER

BACKGROUND

Many organizations, such as hospitals, make supplies available for use in bins. The bins may be stand-alone bins, stacked bins, bins in the form of drawers, and other shapes of bins that are configured to hold one or more supply parts. In the case of hospitals, bins are used to hold thousands of parts, such as electrodes, catheters, tape, test tubes, and many more. In addition, hospitals may include many different departments, and hence bins may be used in many locations within the hospital, with multiple distributed bins even holding the same parts in different locations. Such use of bins makes it convenient for consumers of the parts, as the parts needed for use in caring for patients may be located near the point of service. However, inventory management can be quite complicated.

Prior methods of ensuring bins are sufficiently stocked include having persons perform periodic restocking of parts, ensuring the bins at each location contain sufficient parts. Bar codes may have been used to identify bins. Consumers of the parts also may have identified bins that were out of parts, requesting restocking. Some consumers would even try to locate parts in other bins in different locations when needed in real time. Each of these methods was inefficient and resulted in poor part availability where needed and poor inventory control.

SUMMARY

A system includes a hopper that is a faraday cage configured to receive multiple bins capable of holding one or more parts, each bin having a wirelessly readable identifier tag with a unique digital ID. An antenna is positioned within the hopper to receive wireless signals representative of the unique digital ID of each bin placed within the hopper.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (MID), smart cards, flash memory devices, among others. In contrast, computer-readable media, i.e., not storage media, may additionally include communication media such as transmission media for wireless signals and the like.

The use of bar codes to manage bins that hold parts for use by consumers is helpful in keeping track of the bins but is lacking when it comes to controlling when bins need to be restocked. The codes can help identify which part to add to a bin upon the bin being manually inspected, but still requires periodically manually inspecting each and every bin in an organization by a re-stocker, or receiving notices of empty or bins low in parts by consumers, which usually occurs after the consumer is not successful in locating a needed part.

To better control inventory in bins, the present inventive subject matter utilizes bins with wirelessly readable tags having unique digital Ms. Rather than simply reading the tags on bins, which may be quite difficult when multiple bins are located on a shelf or bin holding units, the tags are only read when the bin is inserted into a hopper that is also a faraday cage. The bin is only inserted into the hopper when it is empty. A tag reading antenna is located in the hopper so that it only receives signals from tags on bins that are in the hopper itself, and not all the tags that are on bins on a shelf or other bin holding unit. The use of the faraday cage configured hopper thus enables the use of well-known RFID technology to determine when bins are empty and need to be restocked. By conveniently placing hoppers, consumers will quickly learn to place the empty bins in the hoppers such that real-time indications of empty bins may be communicated to an inventory management system, allowing fast restocking and better control of inventory turns.

Figure 1:
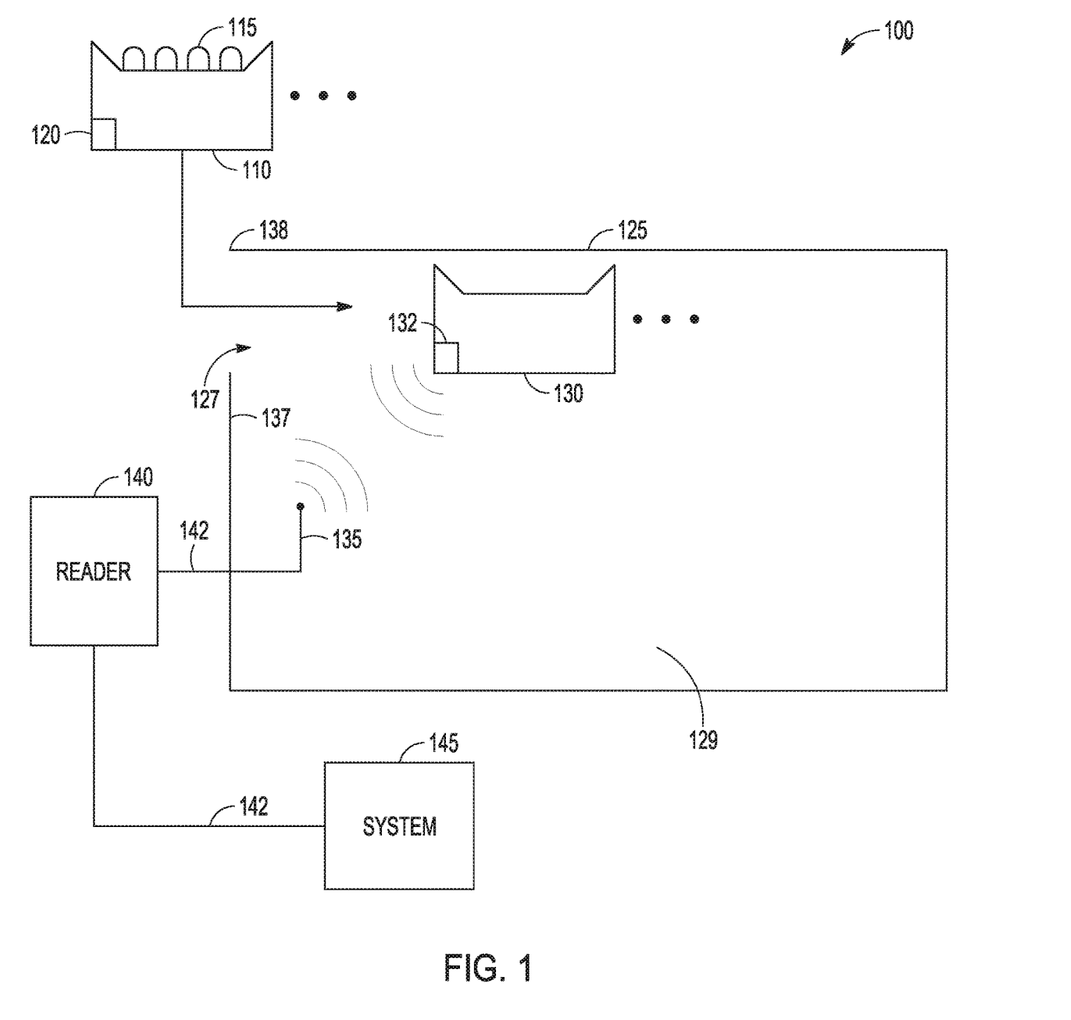
FIG. 1 is a block diagram of a system for performing inventory control according to an example embodiment.

FIG. 1 is a block diagram of a system 100 for performing inventory control. Bins 110 may be used to hold parts 115, The bins 110 may be positioned at different locations within an organization such that the parts 115 may be consumed by multiple different consumers. Each bin 110 includes a wirelessly readable tag 120, such as an RFID tag that has a unique digital ID for each bin 110. The RFID tag can be either passive or active. A passive tag receives signals and uses energy from the received signals to transmit the unique digital. ID. Active RFID tags may include a power source and transmit signals periodically or when queried.

A hopper 125 is used to receive empty bins via an opening 127. The opening 127 may be sized to permit insertion of empty bins into an interior 129, such as empty bin 130 having wirelessly readable tag 132 with a unique digital ID. Opening 127 may be a two-dimensional opening that is slightly larger than a profile of the largest bin to permit ease of insertion. The hopper 125 is configured as a faraday cage such that wireless signals do not enter the hopper 125 or leave the hopper 125. The hopper may be formed to include a conductive metal mesh or sheet, such as aluminum foil for blocking reception and transmission of radio frequency signals through walls of the hopper. The mesh or sheet may be supported by a frame constructed of wood, plastic, or metal. The hopper may be any three-dimensional shape sufficient to hold one or more bins. In one example, the hopper 125 may be in the shape of a cube or elongated cube.

An antenna 135 is positioned with respect to the hopper 125 to receive signals generated from within the hopper 125. The antenna 135 can receive the unique ID from tag 132. In one example, the antenna 135 is coupled to a first side 137 of the hopper. The first side also includes the opening 127 to help minimize antenna 135 reception of signals originating outside the hopper 125 and to minimize transmission of signals by antenna 135 outside of the hopper 125. A second side 138 of the hopper may be formed to extend slightly beyond the side 137 to help further reduce such reception and transmission. The opening 127 may also be sized to allow easy insertion of bins yet minimized in size to prevent undesired reception and transmission by antenna 135.

A reader 140 may be coupled via a conductor 142 to the antenna 135. The reader 140 may include RFID reader circuitry to read the unique digital IDs of bins inserted into hopper 135 by use of the antenna 135. The reader 140 may be communicatively coupled via a wired or wireless connection 142 to a management system 145 for use in tracking the bins. As each bin has a unique digital ID, a data structure may be used by system 145 to identify each bin, the parts the bin is designated to hold, and the number of items to be stocked in a full bin. The system may also track the intended location of the bins.

In various examples, the system 145 may be coupled to multiple hoppers distributed throughout the organization. Where the organization is a hospital, each different department, group, or room may optionally have bins and even hoppers. As a bin becomes empty, the bin is designed to be inserted into any of the hoppers 125. The reader 140 associated with the hopper 125 will cause the antenna 135 to read the unique digital ID from the tag of the bin. That ID will then be sent to the system 145, which may generate a notice that the bin needs to be refilled.

The system 145 may also keep track of dates when bins are inserted into the hopper. The dates may be used to indicate how quickly parts are being used, allowing better control of the amount of a particular part that is restocked in the bin. For example, if the amount of a part in a fully stocked bin is five, and the bin becomes empty with a frequency of about one year, the amount of the part to keep in the bin may be reduced to two, resulting in more turns of inventor per year. As the two are used and the bin becomes empty, the bin is detected in the hopper and may be immediately restocked with two more of the part.

Figure 2:
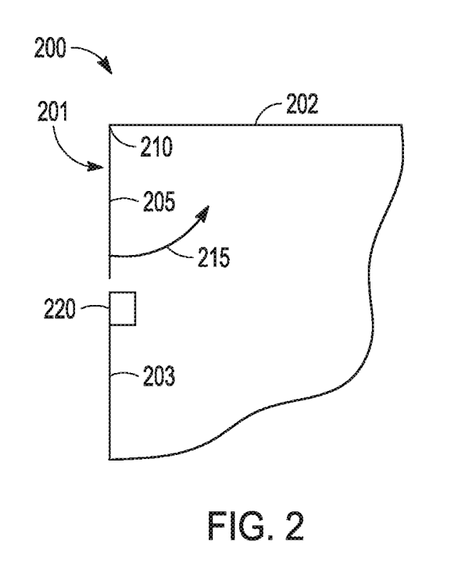
FIG. 2 is a partial view of a hopper having an opening extending between a top and side according to an example embodiment.

FIG. 2 is a partial view of a hopper 200 having an opening 201 extending between a top 202 and side 203. A flap 205 may be coupled to the top 202 via a hinge 210, enabling the flap 205 to rotate inward as indicated by arrow 215 to enable insertion of bins into the hopper 200. The flap 205 may also include a metal mesh or sheet to block or reduce RF transmission through the flap.

The antenna 135 may be turned on periodically to sense tags of bins 110 that have been placed within the hopper 140. In one example, the antenna is turned on every 30 seconds or other desired time and senses the tags of all bins currently within the hopper 140. The reader 140 can detect multiple different tags and differentiate between the tags.

Alternatively, the antenna 135 may be turned on in response to detection of an event. A sensor 220 may be placed proximate the flap 205 to detect movement of the flap or movement of a bin being placed into the hopper 200. Sensor 220 may be a motion sensor to perform these functions, or a contact sensor coupled to sense movement of the flap 205. Sensor 220 may trigger the reader 140 to attempt to read a tag within the hopper. A delay of a few seconds may be waited prior to reading to allow the flap to return to cover the opening 201 and reduce the transmission and reception of radio frequency signals outside the hopper 200. In one example, the flap may reestablish contact as sensed by sensor 220, upon which reading may commence. Similarly, ceased detection of motion may also trigger reading of tags within the hopper. Note that the sensor 220 may be used with or without the flap.

Figure 3:
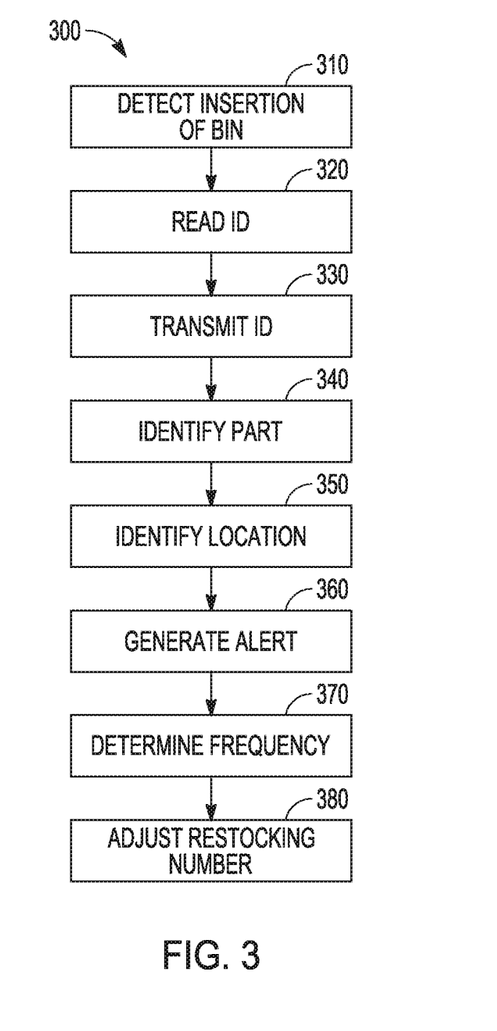
FIG. 3 is a flowchart of a method of detecting bins according to an example embodiment.

FIG. 3 is a flowchart of a method 300 of detecting bins. Method 300 begins at operation 310 by detecting insertion of bin into a hopper comprising a faraday cage. At operation 320, a unique ID of the bin is read from an RFID tag associated with the bin via an antenna positioned within the hopper. The unique ID is transmitted at operation 330 to an inventory management system to identify the bin and enable the inventor management system to identify that the bin needs restocking.

In one example, method 300 continues at operation 340 by identifying a part to be restocked in the bin. The location to place the restocked bin is also identified at operation 350. An alert is generated at operation 360. The alert may identify the bin, the parts to be restocked in the bin, and the location to place the restocked bin. In one example, the alert may be part of a user interface dashboard generated by the inventory management system and shown as a list of bins that need restocking or may even be a text, email, or other communication regarding the need for restocking.

Method 300 may also include recording a date corresponding to each time the bin is inserted into the hopper at operation 360. At operation 370, method 300 determines a frequency of insertion for the bin and at operation 380 adjusts a number of parts for the restocking of the bin to modify a number of turns of the bin. The dashboard may also identify the frequency of insertion and the adjusted number of parts. The dashboard thus allows better inventory control and can be used to obtain a desired number of turns per period of time for bin parts.

Figure 4:
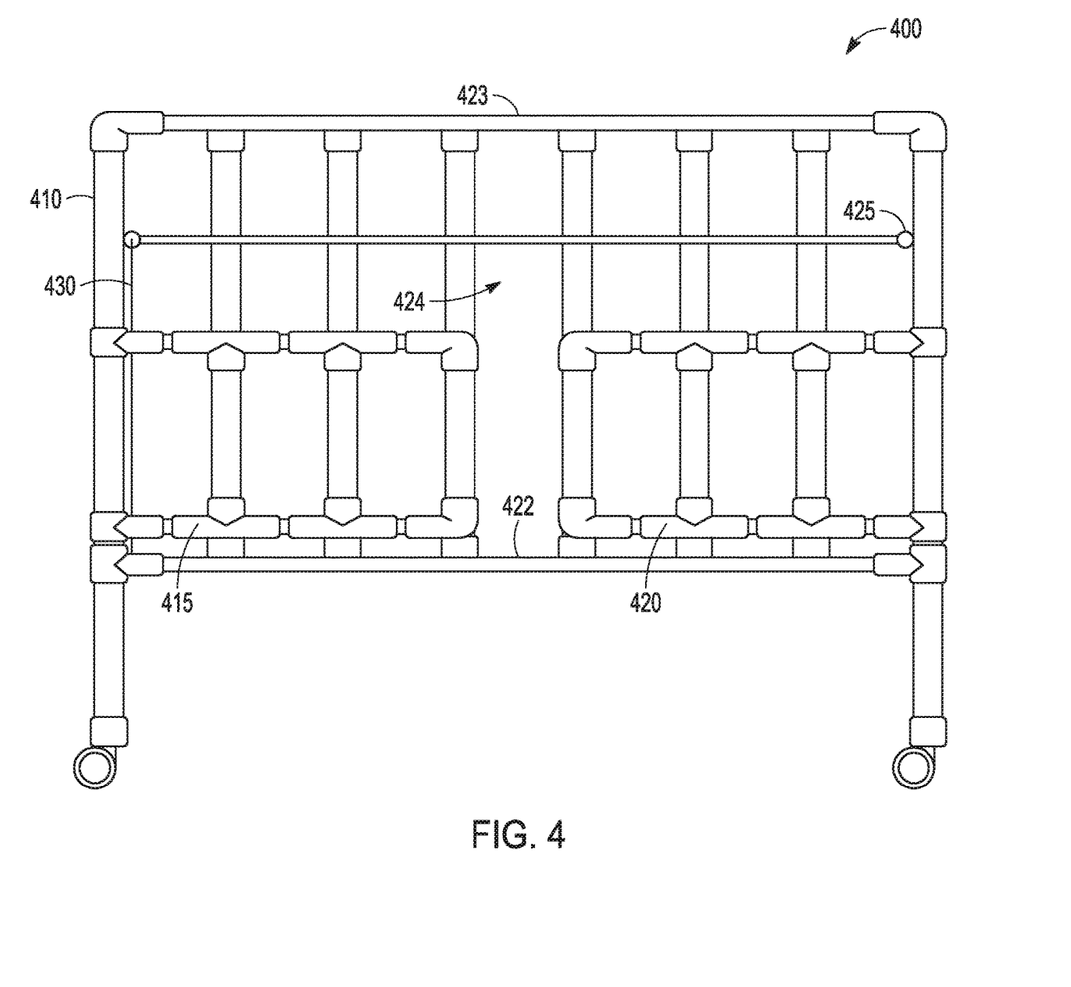
FIG. 4 is a front view of a hopper frame according to an example embodiment.

FIG. 4 is a front view of a hopper frame 400 according to an example embodiment. In one example, frame 400 may be constructed using any type of material capable of supporting weight and holding bins. In the example shown, frame 400 is constructed using PCV pipe, with vertical pieces 410 supporting gates 415 and 420, which are hinged at the vertical pieces 410 to allow access to an inside of the bin. A floor piece 422 may be supported by the upright pieces just below a bottom of the gates 415 and 420. A top of the hopper frame 400 may be defined by cross pieces 423. An opening 424 is provided between a top of the gates 415 and 420 and the cross piece 420. The opening 424 may be used to place bins inside the hopper, supported by the floor piece 422. The hopper in one example has a rectangular box-like construction sized to hold multiple bins. An antenna 425 may be positioned within the hopper. In one example, the antenna 425 may be supported on a back wall of the hopper, opposite the gates 415 and 420, with an antenna cable 430 running from the antenna to the reader. In one example, the antenna 425 may be supported within a tube that is coupled to any of the walls within the hopper.

Figure 5:
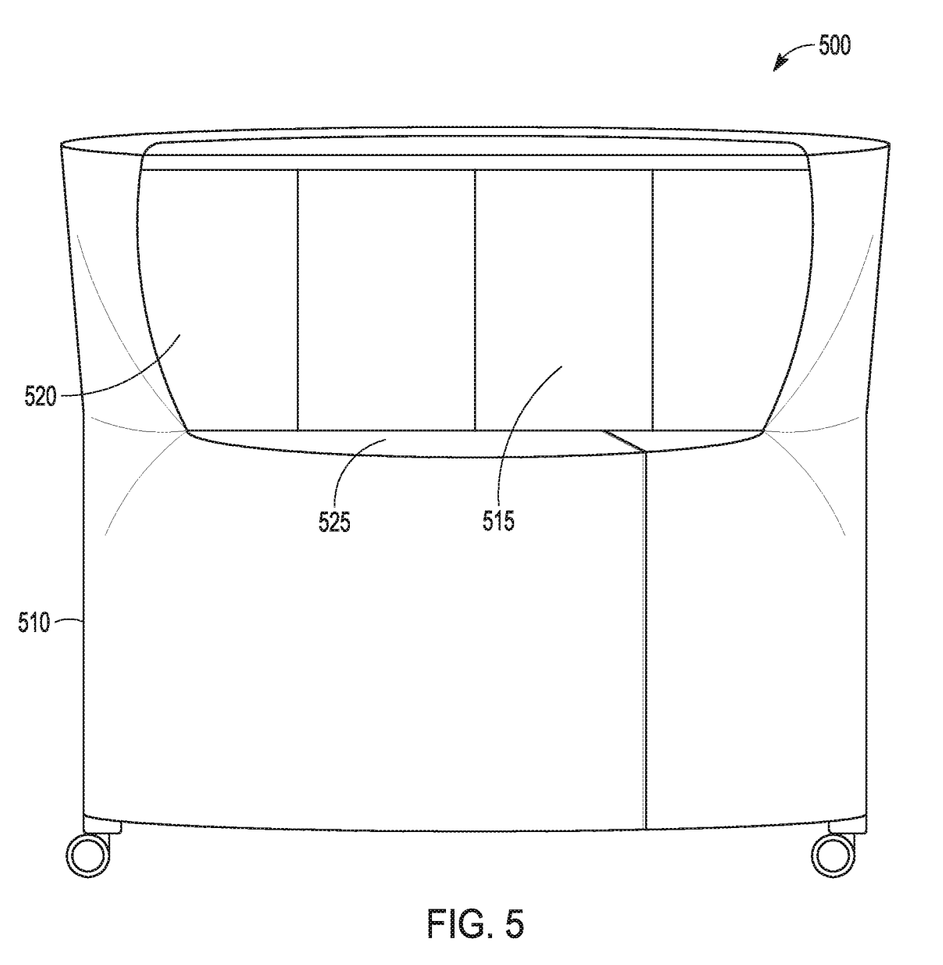
FIG. 5 is a front view of a hopper cover according to an example embodiment.

FIG. 5 is a front view of a hopper cover 500 according to an example embodiment. The hopper cover 500 is sized to fit over hopper 400 and is constructed of vinyl 510 in one example with metallic thread embedded or otherwise sewn into the cover such that the cover acts as a faraday cage. An opening in the cover 500 includes one or more flaps 515 attached at a top of the cover 500. The flaps 515 allow insertion of bins into the hopper through the corresponding opening 424 in the hopper frame. For example, flap 520 may be pushed into the opening 424 or pulled out to reveal opening 424. At rest, the flaps 515, 520, and 530 hang down and cover the opening. The number of flaps may vary in further examples.

Figure 6:
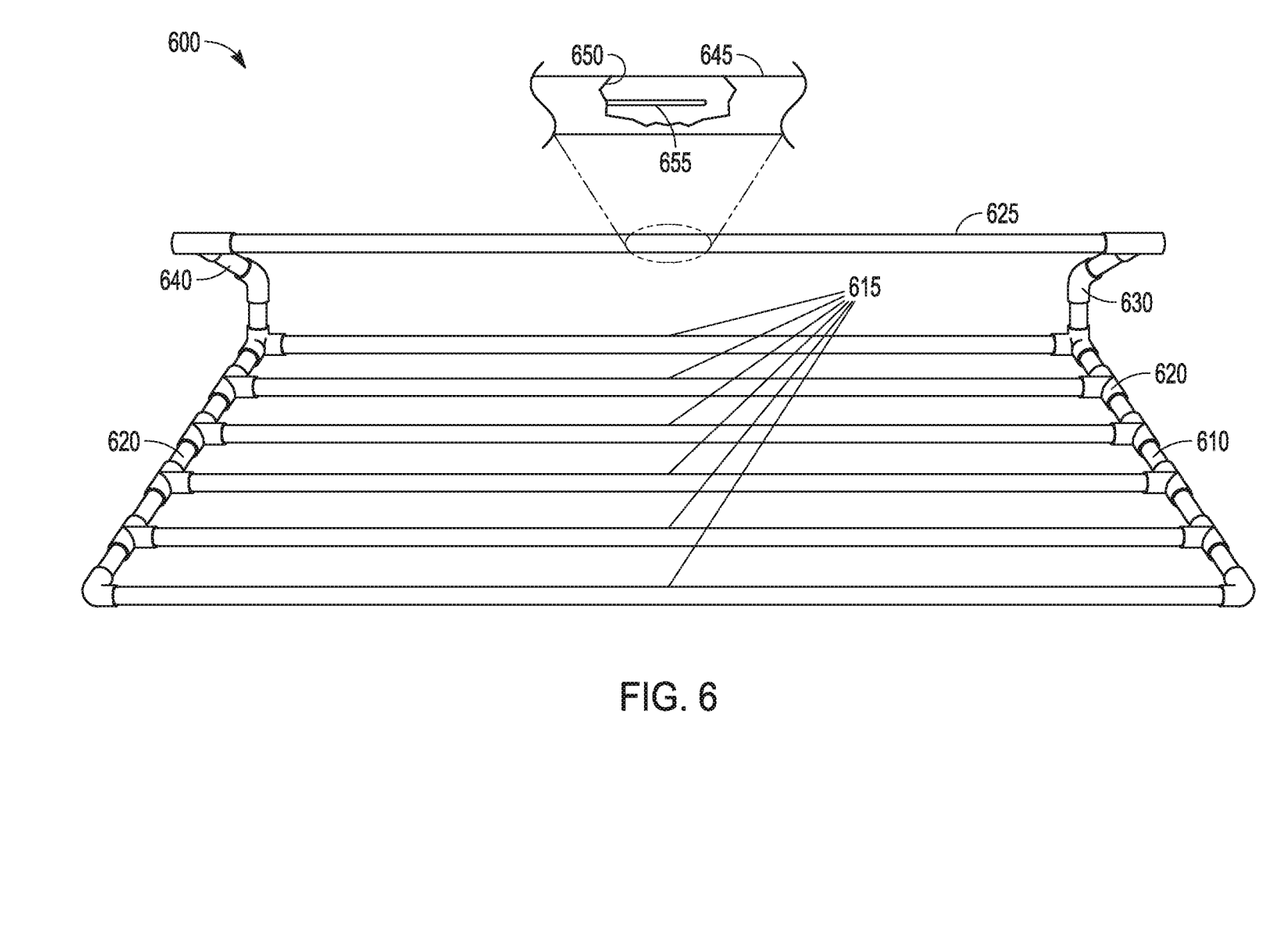
FIG. 6 is a perspective view of a topper frame according to an example embodiment.

FIG. 6 is a perspective view of a topper frame 600 according to an example embodiment. Topper frame 600 includes a relatively flat portion 610 comprising multiple spaced lateral sections 615 coupled between side sections 620 forming a planar support toboggan type of structure. The lateral sections 615 may be substantially parallel to each other and coupled on each end to the respective side sections 620 which may also be substantially parallel to each other. In one example, the sections 615 and 620 are coupled to form a rectangle sized to fit on a shelf of a shelving unit that is configured to hold bins. Note that while pipes, such as PVC type pipes are shown, any other shape of sections made of any type of material may be used in further examples.

Topper frame 600 may also include an antenna section 625 supported by antenna sections 630 and 640 that are coupled to respective side sections 620 to support the antenna section 625 a desired height above the flat portions 610. The antenna section supports 630 and 640 may be segmented as shown with angles between segments to support the antenna section 625 in a desired position. The flat portion may be designed with a sufficient number of lateral sections to provide support for the antenna section 626 and a Faraday cover, shown in FIG. 7.

A section of the antenna section 625, in the form of a pipe, is shown at 645 with a cutaway portion 650 illustrating an RE antenna 655 disposed within the antenna section 625. The antenna 655 will be positioned by the antenna section 625 to shield lower shelves of a shelving unit, such that tags associated with bins stored on such lower shelves will not be readable by an associated reader, which may be placed anywhere in a room, such as by mounting on a wall. Antenna 655 may be positioned to be laterally centered above the shelving unit within the antenna section 625. The reader may be coupled to drive the antenna 655 as previously described. Note that the antenna 655 may be coupled to the antenna section 625 on an outer surface of the antenna section in further examples.

Removing a bin from the shelling unit will be detected by the reader. The removed bin may be placed anywhere in the room, such as in a hopper, or even removed from the room.

Figure 7:
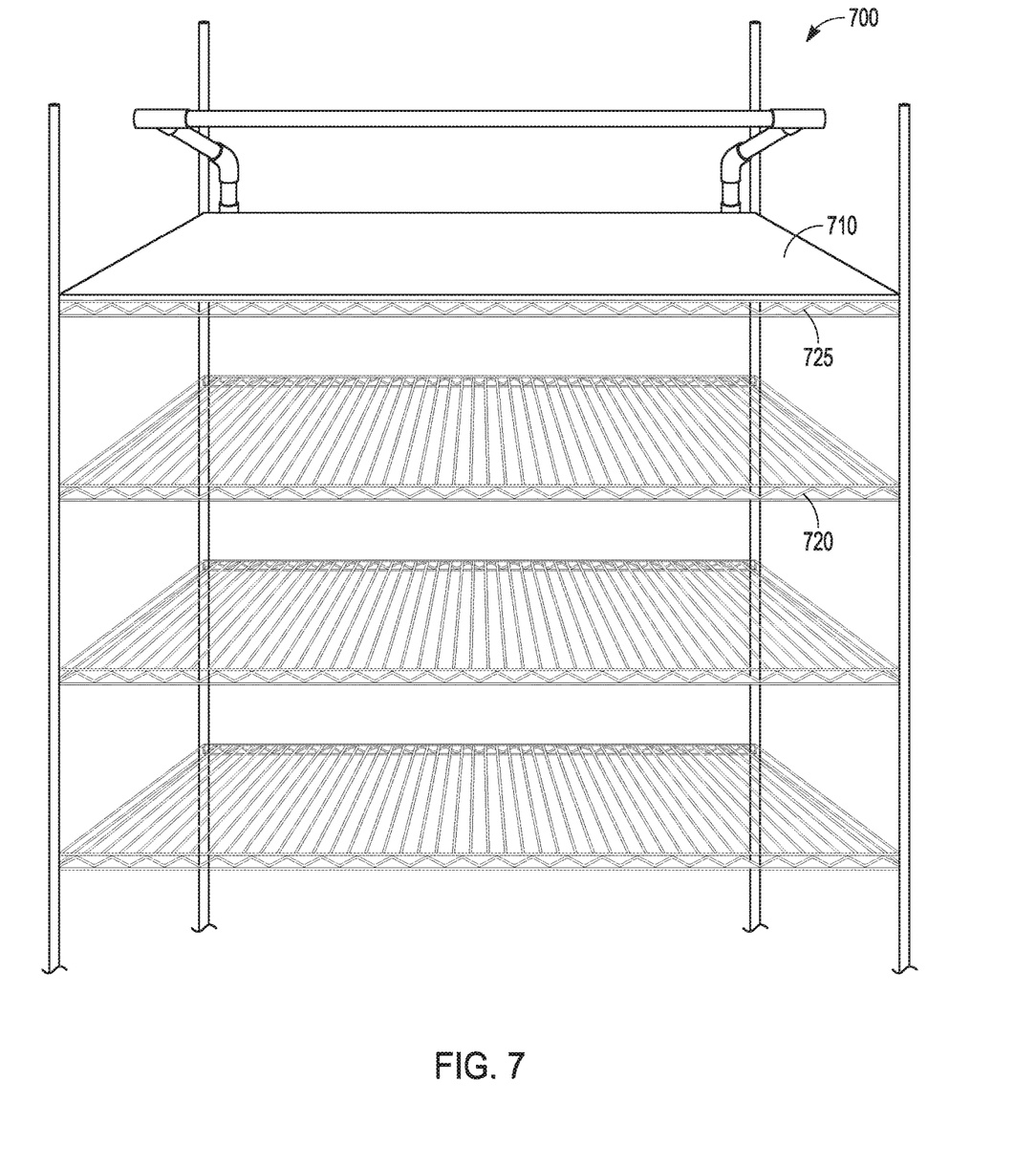
FIG. 7 is a front view of a topper that includes a faraday sheet according to an example embodiment.

FIG. 7 is a front view of a topper 700 that includes a faraday sheet 710. In one example, the faraday sheet 710 may be supported around the portion 610 of the topper frame 600. The faraday sheet 710 may be in the shape sheet, or in the shape of a pocket or pillowcase that surrounds the flat portion 610. At least one side of the sheet 710 when formed to surround the portion 610. The same material as used for the cover 500 may be used for the sheet 710.

Note that the actual shape of the flat portion 610 need not be totally flat, but may be somewhat curved if desired, so long as it serves the function of supporting the faraday sheet such that bins on lower shelves of a shelving unit 720 are not detected by the reader but are detectable when removed from the shelving unit 720 and laterally moved away from the shelving unit 720.

The topper 700 is an open-air solution that keeps RFID electromagnetic waves confined, separating the antenna 655 from tags of bins stored on lower shelves. In one example, topper 700 may sit on a top shelf 725 of the shelving unit 720, with shelves below storing bins with parts. Shelving unit 720 may be constructed of any material. Typical shelving units may be wire shelving units. Topper 700 is useful where there may be no room for a hopper for bins.

The flat portion 610 may be in any shape desired, such as 2 feet×3 feet, 2 feet×4 feet, 2 feet×5 feet, and 2 feet×6 feet to fit on the top of various carts and shelving units. These sizes are simply examples, and the shape may be easily varied to fit any type of shelving unit, table, cart, or other surface under which bins with tags may be stored.

The faraday sheet 710 keeps the antenna 655 signal from reaching and reading tags of fully stocked bins on lower shelves. The positioning of the antenna pipe 650 in an arch above the sheet faraday sheet 710 helps keep transmitted signals from reaching lower shelves. The height of the antenna 655 may be modified in further examples to take into consideration a shelf nearby. With the topper portion 610 and cover 710 reaching a front of the shelf it is placed on, most of the signal from the antenna 655 is blocked from moving down.

With multiple toppers in one room and all antennas work as a team without interference to direct empty bins to one "room." If there is more than one shelving unit in a room, each may include a topper. In one example, a bin is detected as empty only when detected by the reader and antenna of all of the toppers 700 in the room using simple logic in system 145, provided each topper 700 is properly identified as associated with the same room in the system 145.

In one example, a system includes a faraday sheet configured to fit on a surface of a storage unit. An antenna is supported above the faraday sheet by an antenna support structure. The antenna is coupled to a reader. The faraday sheet is positioned to block signals from the antenna to one or more bins positioned below the surface of the storage unit, each bin having a wirelessly readable identifier tag with a unique digital ID.

In a further example, a faraday blocking structure is placed between an antenna coupled to a reader and one or more bins having wirelessly readable identifier tags with unique digital IDs. Moving a bin to an area where the faraday blocking structure does not block signals to or from the antenna allows the reader to detect the tag, obtain the corresponding digital ID, and interface with a management system to track bins and associated parts and provide restocking guidance.

Figure 8:
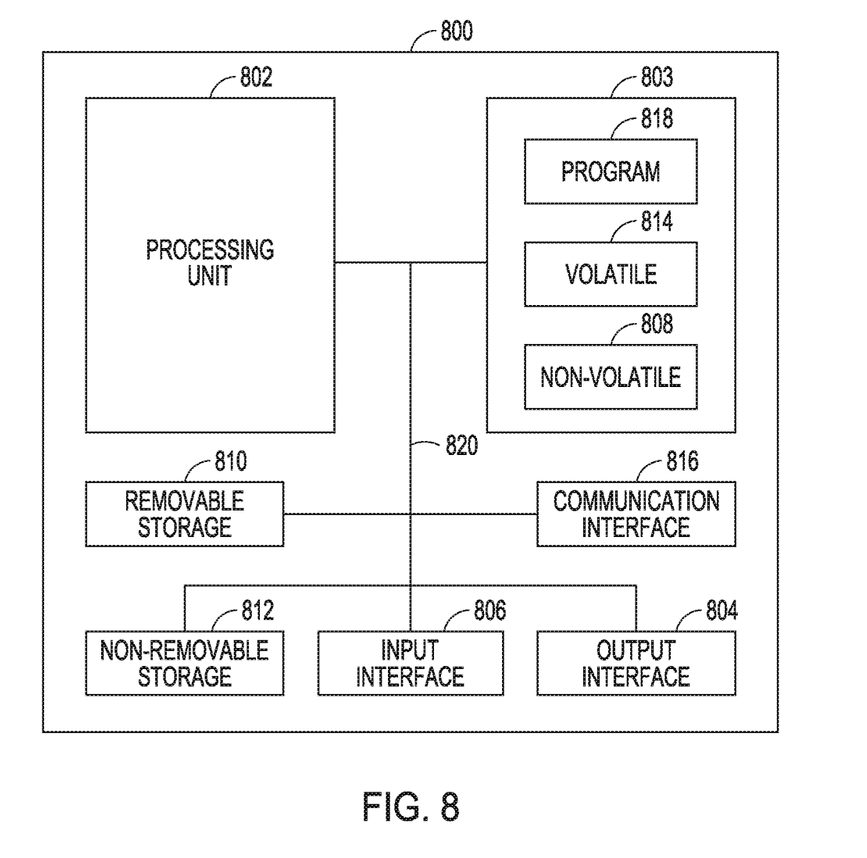
FIG. 8 is a block schematic diagram of a computer system to implement one or more example embodiments.

FIG. 8 is a block schematic diagram of a computer system 800 to implement one of more of the reader 160 and system 165 and for performing methods and algorithms according to example embodiments. All components need not be used in various embodiments.

One example computing device in the form of a computer 800 may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, smart storage device (SSD), or other computing device including the same or similar elements as illustrated and described with regard to FIG. 8. Devices, such as smartphones, tablets, and smartwatches, are generally collectively referred to as mobile devices or user equipment.

Although the various data storage elements are illustrated as part of the computer 800, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input interface 806, output interface 804, and a communication interface 816. Output interface 804 may include a display device, such as a touchscreen, that also may serve as an input device. The input interface 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network a peer device or other common data flow network switch, or the like. The communication connection may include a Local Area Network (LAN), a Wide Area Network (WAN), cellular, Wi-Fi, Bluetooth, or other networks. According to one embodiment, the various components of computer 800 are connected with a system bus 820.

Computer-readable instructions stored on a computer-readable medium are executable by the processing unit 802 of the computer 800, such as a program 818. The program 818 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 818 along with the workspace manager 822 may be used to cause processing unit 802 to perform one or more methods or algorithms described herein.

In one example, a method includes using at least one sheet of rf blocking material to block signals to and from an antenna of a detector disposed on a first side of the RF blocking material from reaching RF tags on objects placed on a second, opposite side of the RF blocking material. A unique ID of the object is read from an RFID tag associated with the object once the object is moved such that RF signals to and from the antenna reach the RFIC tag. The unique ID is then transmitted to an inventory management system to identify the object and enable the inventory management system to identify that the bin needs restocking.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system comprising:
    a plurality of bins capable of holding one or more parts, each bin of the plurality of bins having a wirelessly readable identifier tag with a unique digital ID;
    a hopper comprising a faraday cage configured to receive multiple empty bins; and
    a reading device comprising:
    an antenna positioned to receive wireless signals representative of the unique digital ID of each bin of the multiple empty bins placed within the hopper; and
    reading circuitry communicatively coupled to the antenna to convert the wireless signals to the unique digital IDs and transmit the unique digital IDs to a management system configured to track each bin of the multiple empty bins.

2. The system of claim 1 wherein the wirelessly readable identifier tag comprises RFID tags and the reading circuitry is configured to provide energy via the antenna to the RFID tags and wherein each bin of the plurality of bins is dedicated to a particular part.

3. The system of claim 1 and further comprising a sensor positioned to detect insertion of the multiple empty bins into the hopper and trigger reception of the wireless signals from the wirelessly readable identifier tag.

4. The system of claim 1 wherein the reading circuitry is configured to periodically receive the wireless signals representative of the unique digital ID of each bin of the multiple empty bins placed within the hopper and to only transmit the unique digital ID of each bin of the multiple empty bins once placed within the hopper.

5. The system of claim 1 wherein the antenna is positioned within the hopper.

6. The system of claim 5 wherein the reading circuitry is positioned outside the hopper and is coupled to the antenna via a wired connection.

7. The system of claim 1 wherein the hopper comprises an opening configured to receive the multiple empty bins.

8. The system of claim 7 and further comprising a moveable flap configured to moveably cover the opening.

9. The system of claim 8 wherein the flap contains radio frequency blocking material.

10. A system comprising:
a hopper comprising a faraday cage configured to receive multiple bins capable of holding one or more parts, each bin of the multiple bins having a wirelessly readable identifier tag with a unique digital ID; and
an antenna positioned within the hopper to receive wireless signals representative of the unique digital ID of each bin of the multiple bins placed within the hopper.

11. The system of claim 10 and further comprising a sensor positioned to detect insertion of each bin of the multiple bins into the hopper and trigger receiving the wireless signals from the RFID tags.

12. The system of claim 10 wherein the hopper comprises an opening configured to receive each bin of the multiple bins.

13. The system of claim 12 and further comprising a moveable flap containing radio frequency blocking material configured to moveably cover the opening.

14. The system of claim 10 and further comprising circuitry electrically coupled to the antenna, the circuitry located outside the hopper.

15. The system of claim 14 wherein the circuitry is configured to convert the wireless signals to the unique digital IDs and
transmit the digital IDs to a management system configured to track the bins.

16. The system of claim 14 wherein the circuitry is configured to periodically receive the wireless signals representative of the unique digital ID of each bin of the multiple bins placed within the hopper and to only transmit the unique digital ID of each bin of the multiple bins once the bin is placed within the hopper.

17. The system of claim 14 wherein the wirelessly readable identifier tag comprises RFID tags and the circuitry is configured to provide energy via the antenna to the RFID tags.

18. A method comprising:
detecting insertion of a bin into a hopper comprising a faraday cage;
reading a unique ID of the bin from an RFID tag associated with the bin via an antenna positioned within the hopper;
transmitting the unique ID to an inventory management system to identify the bin and enable the inventory management system to determine that the bin needs restocking.

19. The method of claim 18 and further comprising:
identifying a part to be restocked in the bin;
identifying a location to place the bin that has been restocked; and
generating an alert identifying the bin, the part to be restocked in the bin, and the location to place the bin that has been restocked.

20. The method of claim 18 and further comprising:
recording a date corresponding to every time the bin is inserted into the hopper;
determining a frequency of insertion for the bin; and
adjusting a number of parts for restocking the bin to modify a number of turns of the bin.

\* \* \* \* \*